United States Patent
Messina et al.

(10) Patent No.: US 10,784,663 B2
(45) Date of Patent: Sep. 22, 2020

(54) APPARATUS FOR REMOVING AN INNER SHEATHING OF ELECTRICAL CONDUCTORS

(71) Applicant: SCHLEUNIGER HOLDING AG, Thun (CH)

(72) Inventors: Carmelo Messina, Baar (CH); Jörg Furrer, Horw (CH); Klemens Imholz, Zug (CH); Roman Widmer, Birmensdorf (CH)

(73) Assignee: SCHLEUNIGER AG, Thun (CH)

( * ) Notice: Subject to any disclaimer, the term of this patent is extended or adjusted under 35 U.S.C. 154(b) by 217 days.

(21) Appl. No.: 15/810,645

(22) Filed: Nov. 13, 2017

(65) Prior Publication Data

US 2018/0138672 A1  May 17, 2018

(30) Foreign Application Priority Data

Nov. 15, 2016 (EP) ..................................... 16199002

(51) Int. Cl.
*H02G 1/12* (2006.01)

(52) U.S. Cl.
CPC ............. *H02G 1/1265* (2013.01); *H02G 1/12* (2013.01); *H02G 1/127* (2013.01)

(58) Field of Classification Search
CPC ........ H01B 15/00; H01B 15/005; H02G 1/12; H02G 1/1265; H02G 1/127
See application file for complete search history.

(56) References Cited

U.S. PATENT DOCUMENTS

| 3,128,658 A | | 4/1964 | Mitchell et al. | |
| 4,247,980 A | * | 2/1981 | Tominoi | H01R 43/04 29/742 |
| 4,330,927 A | * | 5/1982 | Wolfthal | H01R 43/04 29/564.4 |
| 4,517,718 A | * | 5/1985 | Johnson, Jr. | H01R 43/042 29/33 M |

(Continued)

FOREIGN PATENT DOCUMENTS

| CH | 710 236 A2 | 4/2016 |
| CN | 102 130 410 A | 7/2011 |

(Continued)

OTHER PUBLICATIONS

European Search Report Corresponding to 16199002.3 dated Apr. 21, 2017.

(Continued)

*Primary Examiner* — Carl J Arbes
(74) *Attorney, Agent, or Firm* — Davis & Bujold PLLC; Michael J. Bujold

(57) ABSTRACT

An apparatus for removing an inner sheathing of electrical conductors of a preferably multi-core cable comprises at least one holding arrangement/clamping device for axial and rotational clamping of the cable and a cutter assembly (1, 21) that can be rotated about the cable longitudinal axis, to the cutters of which a force can be applied in the direction of the cable axis. The at least one cutter (24, 26) comprises a contact surface (26) provided for placing on the surface of the inner sheathing and directly adjacent thereto a cutting edge (24), which protrudes beyond this contact surface (26).

9 Claims, 2 Drawing Sheets

(56) References Cited

U.S. PATENT DOCUMENTS

Figure 1:
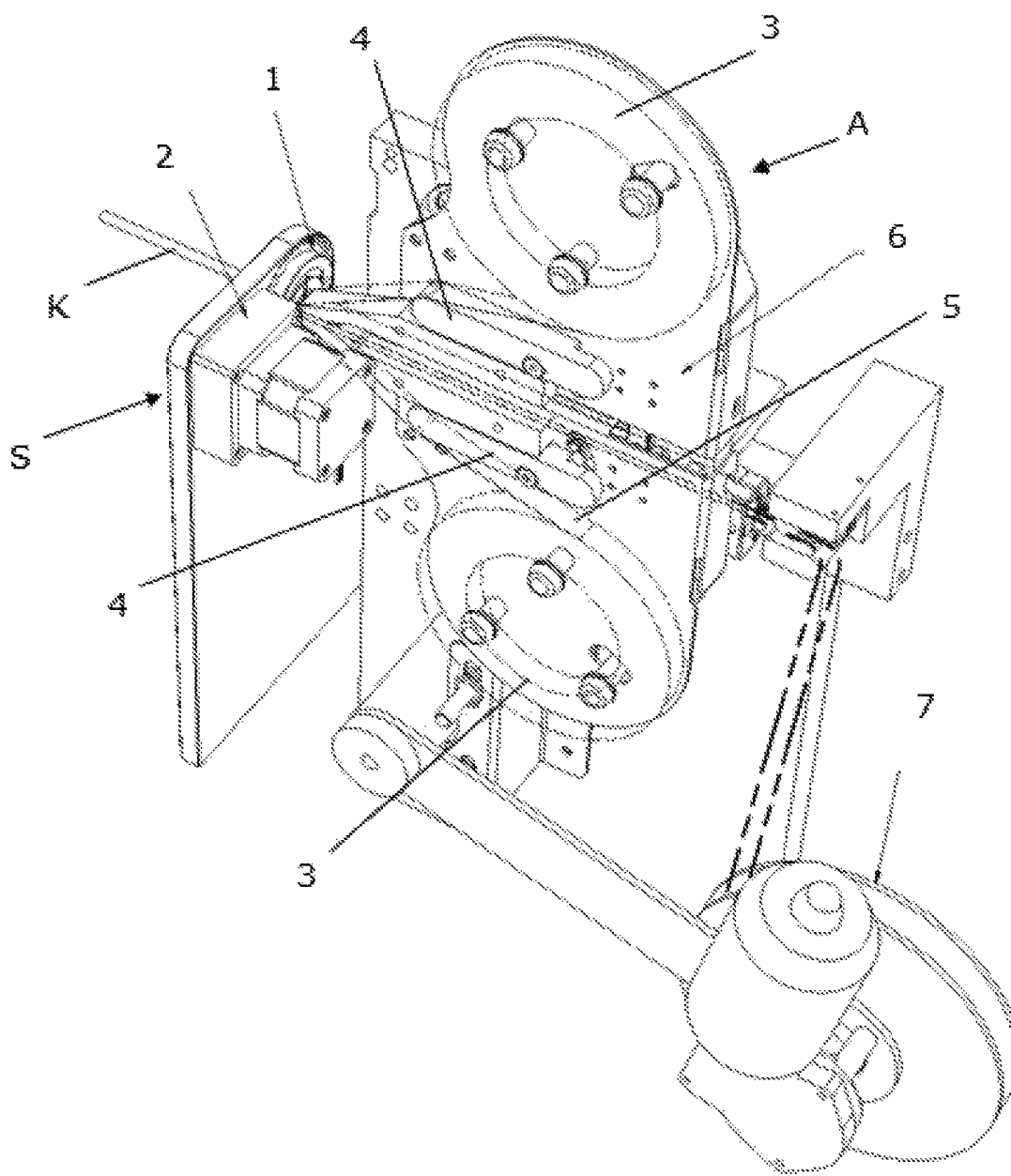

| | | | | |
|---|---|---|---|---|
| 4,612,691 A * | 9/1986 | Aikens | .................. | H01R 43/28 |
| | | | | 29/33 M |
| 5,361,653 A | 11/1994 | Pradin | | |
| 5,664,324 A * | 9/1997 | Hoffa | .................. | H02G 1/1256 |
| | | | | 29/33 M |
| 6,108,910 A * | 8/2000 | Sorkin | ................ | H02G 1/1221 |
| | | | | 30/90.4 |
| 8,092,100 B2 * | 1/2012 | Song | ..................... | G02B 6/245 |
| | | | | 385/134 |
| 10,056,743 B2 * | 8/2018 | Dober | .................. | H02G 1/1253 |
| 2013/0247728 A1* | 9/2013 | Sekine | .................. | G02B 6/245 |
| | | | | 83/27 |
| 2016/0322792 A1* | 11/2016 | Dober | .................... | H02G 1/127 |

FOREIGN PATENT DOCUMENTS

| | | |
|---|---|---|
| DE | 1 490 940 | 9/1971 |
| DE | 43 36 539 A1 | 4/1995 |
| EP | 2 871 734 A1 | 5/2015 |
| EP | 3 089 294 A1 | 11/2016 |
| JP | S50-077887 U | 7/1975 |
| KR | 101 610 306 B1 | 4/2016 |
| WO | 97/17626 A1 | 5/1997 |
| WO | 2008/152551 A1 | 12/2008 |
| WO | 2010/061303 A2 | 6/2010 |

OTHER PUBLICATIONS

European Search Report Corresponding to 16199001.5 dated Aug. 29, 2017.

\* cited by examiner

APPARATUS FOR REMOVING AN INNER SHEATHING OF ELECTRICAL CONDUCTORS

The invention relates to a device for removing an inner sheathing of electrical conductors of a preferably multi-core cable, preferably a foil located between a screen or an insulation and the inner conductors, comprising at least one holding arrangement/clamping device for the axial and rotary clamping of the cable, and a cutter assembly that can be rotated about the cable longitudinal axis, to the cutters of which a force can be applied in the direction of the cable axis, in accordance with the preamble of patent claim 1, and to a method for removing an inner sheathing of electrical conductors of a multi-core cable, preferably a foil located between a screen or an insulation and the inner conductors, in accordance with the preamble of the patent claim 11.

The strands of cables, in particularly in cables with a plurality of strands, are sometimes wrapped with a foil. This must be removed for processing the stranded wires, which can be very difficult, partly due to the wrapping angle, the thickness of the foil, the foil material, overlap, etc. Seen in cross section, the shape of the foil appears not necessarily round, because it can at least partially conform to the shape of the underlying strands, which in the case of a cable with four strands, for example, can give the cross section an outline something like the shape of a clover leaf.

Conventional solutions provide, for example, a "blowbrush mechanism", such as is disclosed for example in EP 2871734 A1. In this arrangement, a socket-shaped holder is provided for the end of the cable to be processed, as well as a work head which is axially movable relative to the holder with respect to the axis of the central opening, and which has at least one central compressed air nozzle aligned with the end of the cable. This enables the foil sheathing of the inner conductors to be opened rapidly and in a very gentle way, by rupturing it or at least blowing it open using the compressed air blast or compressed air flow. By means of a rotating cutting or milling head, in the rotational axis of which the compressed air nozzle and the compressed air feed line leading to this compressed air nozzle are mounted, the removed foil can then be ultimately removed. The processing head can also be fitted with an axial oriented cutting ring, the circumference of which is the same as that of the inner conductors.

CH 710236 A2 discloses a sheathing cutting device with a rotating blade for an outer insulator a cable. This is used to perform an incision in a sheathing of an electrical conductor with insulation sheathing, for which purpose the arrangement comprises a disc cutter, a lifting unit that raises and lowers the disc cutter in the vertical direction, and a transverse displacement unit, which moves the disc cutter in the left-right direction forwards and backwards. The disc cutter is displaced by the lifting unit and the transverse displacement unit during the incision into the sheathing of the electrical conductor, in such a way that the cutter circulates around the circumference of the electrical conductor, wherein an incision is made by shifting a contact point of the disc cutter on the sheathing. The circulation is adjustable, but it is not explained on what basis and with what parameters the adjustment happens.

It has also been proposed several times that the foil can be stripped using lasers, as disclosed for example in KR 101610306 B1. These methods are not yet fully ready to be deployed however.

None of the above conventional solutions are optimally suited to cables with in particular irregularly shaped cross section. A wide range of cable types cannot be processed at all, and these techniques often lack the reliability and processing safety required for industrial use. The location of the inner strands can also be a problem, in particular with twisted strands in combination with positive locking cutting devices, because it is then not clear where the strands and the spaces in between them are located.

It was therefore the object of the present invention to specify an apparatus and a method for removing an inner sheathing of electrical conductors of a preferably multi-core cable, which have high reliability and degree of automation and are suitable for as many cable types as possible.

The object is achieved in accordance with the invention by a method as described above, characterised in that the at least one cutter comprises a contact surface provided for placing on the surface of the inner sheathing and directly adjacent thereto a cutting edge, which protrudes beyond this contact surface preferably by no more than the thickness of the sheath. Here the foil is scored by means of a blade rotating around the cable, and the pieces of foil that are cut off or at least incised are removed preferably by a separate extraction mechanism. Scoring the foil is critical, because on the one hand the blade must penetrate deeply enough that the foil always tears, however, the blade must not penetrate so deeply that underlying strands are damaged. This is ensured by the interaction of the contact surface and the cutting edge with a defined fixed overhang over the contact surface, in which the contact surface rests on the outer side of the foil and the cutting edge penetrates into the foil to a depth specified by the fixed overhang, preferably no further than the surface of the strands.

In accordance with a further feature of the invention, it is preferred that the contact surface and the cutting edge are positioned on a cutting arm, which is fastened to a mounting point on a cutting wheel surrounding the cable and oriented coaxially thereto and can be pivoted about an axis passing through the mounting point and oriented substantially parallel to the axis of rotation. This enables an optimum tracking of the blade along the surface contour of the foil covered strands.

If, in accordance with an additional optional feature of the invention, the cutting arm is movably and detachably fastened to the cutting wheel by means of a magnet, this allows a simple and rapid replacement of the cutting arm, and therefore also of the contact surface connected to the cutting arm blade.

In accordance with a further advantageous embodiment of the invention it is provided that the cutting arm extends from the mounting point on the cutting wheel to a sector of the cutting wheel substantially opposite thereto with respect to the centre of the cutting wheel, in which sector an arrangement is located that acts on the cutting arm and exerts a preferably constant force, which is applied to the cutting arm in the direction of the axis of the cutting wheel, on the cutting arm. The force on the cutting arm can be particularly well metered and also, by exploiting the lever effect, generated by means of small-sized actuators.

A preferred embodiment of the invention is one in which the arrangement contains a magnet which exerts a force applied to the cutting arm.

In order to facilitate the introduction of the cable into the device according to the invention in a simple and automatable manner, an embodiment according to the invention is provided according to which a controllable actuator is provided on the cutting wheel, which is designed to apply a force to the cutting arm moving the cutting arm away from the axis of the cutting wheel. Alternatively, it could also be provided that a controllable actuator is provided near to the cutting wheel, which is designed to fix the free end of the cutting arm but does not impede the rotation of the cutting wheel.

A preferred variant of the device according to the invention is one in which the contact face and the cutting edge are formed on a tab or tongue protruding from the cutting arm in the direction of the centre of the cutting wheel. This allows the blade to follow the contour of the foil stretched over the strands as closely as possible, even if the circumference has irregular contours. The contact surface and the cutting edge are preferably formed in the region of a convex section of the cutting arm, the tab or the tongue, allowing the advantage mentioned above to be even better utilized. It is particularly preferred in this case that the contact surface, which comes into contact with the cable, and the cutting edge are themselves convex in shape, in order thereby to be able to follow the circumferential contour of the foil-covered strands very accurately and in particular, to penetrate as deep as possible into the valleys between the strands.

To increase the processing safety and/or the ease with which the method can be automated, as a further optional feature of the invention it can be provided that the cutting edge or the cutting arm has a coding for characteristic properties of the arrangement consisting of cutting edge, contact surface and cutting arm, and/or as a marker of a reference position of the cutting wheel. As an additional feature, a scanning device for scanning the coding is integrated in the device and an evaluation unit is integrated in the device, which can be used to receive and further process the signal from the scanning device. On the one hand this enables a test routine to be easily implemented, with which it can be ensured that the optimally suitable blade is used for each cable type. Alternatively or additionally, however, the coding can also be used as a reference mark for detecting the position of the cutting wheel.

Since the foil cannot usually be removed from the stranded wires of the cable by cutting alone, a preferred embodiment of the apparatus according to the invention provides that an extraction device is integrated in the apparatus for the parts of the sheathing that are cut off or incised, and is designed for automatically axially extracting the sheathing. Advantageously, at least one adhesive tape or similar is additionally used, with which a frictional connection to the cut sections of foil is produced and these can then be extracted in the direction of the cable axis.

The extraction of the cut foils requires relatively large force. This force is difficult to transfer to the foils. This is where the adhesive tape comes into play. Through the use of preferably two adhesive tapes, the foil is completely enclosed on the stranded wires. The tensile force on the adhesive tape is transferred directly onto the foil. This also allows firmly seated foils to be removed from the cable. The foil cannot be removed by means of friction alone, because the friction between the extracted part and the foil would be roughly equal to the friction between the foil and the strands. After pressing on the adhesive tape, no more pressure is required that would counteract the extraction. The adhesive force is used for the extraction. The extracted foils remain on the adhesive tape, which is continuously unwound. Thus, there is no need for foil remnants to be sucked away or removed in some other way.

In order to enable even the last remaining foil residues to be safely removed, in accordance with a further advantageous embodiment of the invention a sheathing abrasion arrangement is integrated into the apparatus. This arrangement is preferably positioned between the extraction device and the cutter assembly.

When the scored foil is torn off, it is still possible that foil residues may remain behind on the cable. These are drawn back with an arrangement consisting of centrally closing shaped jaws.

Overall, with the device according to the invention it is easily possible to design the removal of the foil more reliably, and thereby increase the processing safety. It is possible to strip foil from cables where previous solutions have failed, the effort required for adjusting or aligning the apparatus can be kept low, and the options for controlling the stripping process are extended. All of the foil residues are removed cleanly.

The object defined above is also achieved by a method for removing an inner sheathing of electrical conductors of a multi-core cable, preferably a foil located between a screen or an insulation and the inner conductors. This fundamentally comprises the clamping of the cable and the tangential incision of the inner sheathing in the course of a rotary motion of a cutter assembly about the cable longitudinal axis with simultaneous application of a force to the cutting edges towards the cable axis.

According to the invention, this method is characterized in that one end of the cable is pushed through the cutter assembly and fixed, that the sheathing is incised by means of a rotating movement of the cutter assembly around the cable and then axially extracted, wherein at least during the rotating motion of the cutter assembly, a preferably constant force is applied to the cutter assembly towards the cable.

In a preferred variant of this method, the force applied to the cutter assembly is effected by magnetic or electromagnetic means.

For certain types of cables, it has proved advantageous if, in accordance with an optional variant the rotary movement of the cutter assembly is reversed at least once, preferably multiple times. Other factors including the speed of rotation of the blade wheel, the number of revolutions and their directional sequence, and possibly a second cutting operation after first removing the foil, can substantially improve the result.

It can also be advantageously provided in the method according to the invention that at at least one point of the method a reference position is approached, preferably after securing the cable and before the actual cutting operation, wherein this reference position is determined by reading out a coding on one of the rotating parts, preferably the blade or cutting arm.

Other advantages, features, and details of the invention emerge from the following description, in which exemplary embodiments of the invention are described by reference to the drawings. The features identified in the claims and in the description can be essential to the invention, either individually or in any desired combination.

The list of reference labels forms part of the disclosure. The Figures will be described in combination and taken as a whole. Identical reference labels indicate identical components, and reference labels with different indices indicate functionally equivalent or similar components.

Figure 2:
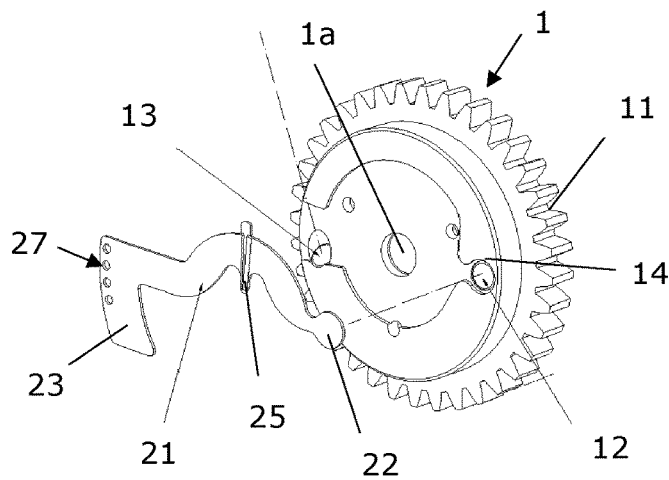
Figure 3:
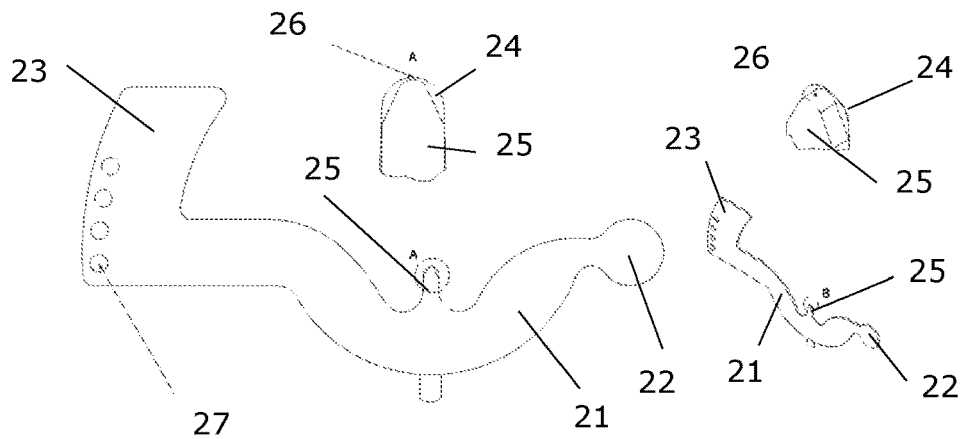
Figure 4:
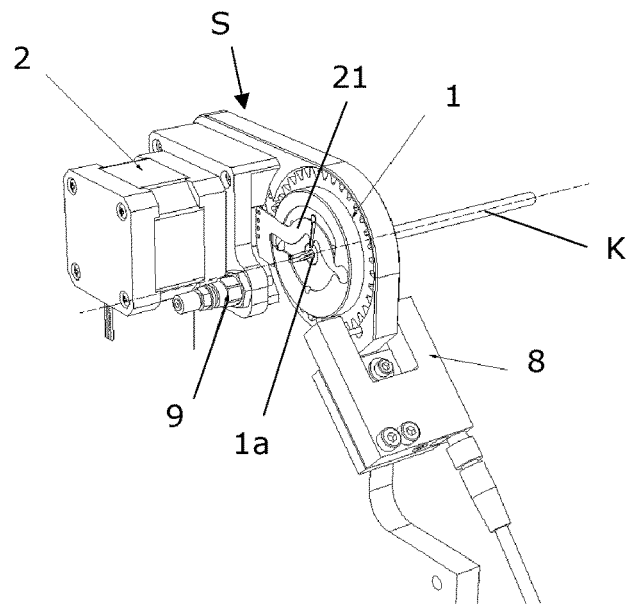

Shown are:

FIG. 1 an apparatus according to the invention in a perspective view,

FIG. 2 the cutting wheel of the apparatus according to the invention separately and on a larger scale, with the cutting arm in an exploded view, FIG. 3 the cutting arm and as a highlighted detail with blade and contact surface, in plan view and in perspective view, and FIG. 4 the cutting wheel in the installed state in the cutting part of the apparatus, together with the arrangement for opening the cutting arm and for determining the position of the cutting wheel.

FIG. 1 shows the device according to the invention in its entirety. In the version illustrated, it comprises the following assemblies: cutting device S with at least one holding arrangement or clamping device for axially and rotationally clamping the cable (not shown), the cutting wheel 1 and drive 2, the extraction device A for the cut foil sections, with two adhesive tape rollers 3 for gripping the foil, with two clamping jaws 4 for the adhesive tape 5, both on a displaceable carriage 6 and with a retracting roller 7 for the tape with the foil pieces. A sheathing abrasion arrangement (not shown) could be integrated in the device if necessary.

The cutting wheel 1—as visible in FIG. 2—is fitted with a ring gear on the outer circumference, with which the drive 2 engages. Two bar magnets 12, 13 are mounted, preferably on opposite sides to one another with respect to the rotation axis. The first magnet 12 is mounted with its axis parallel to the axis of the cutting wheel 1 and is used for the pivotable attachment of the cutter assembly 21, in which the magnet 12 pulls a rounded end 22 of the cutting arm 21 as the pivot point of the cutting arm 21 into the milled-on part 14 of the cutting wheel 1.

The second magnet 13 is mounted such that it is pivoted relative to the axis of rotation of the cutting wheel 1 by 45°. This generates a radial force on the end 23 of the cutting arm 21 opposite the pivot point, which applies a force to the latter in the direction of the axis of rotation of the cutting wheel 1. This magnetic force also produces the pressing force of the blade 24 on the cable. By this arrangement of the two magnets 12, 13, the cutting arm 21 can be replaced very quickly and easily, because it is only held in position magnetically.

At the end of a tongue protruding from the central region of the cutting arm 21 in the direction of the cutting wheel 1, the blade 24 and a polished contact surface 26 are arranged. This is shown explicitly in FIG. 3. Relative to the polished contact surface 26, the blade 24 has a defined overhang. Depending on the cable type, this can preferably vary between 0.03 to 0.1 mm. The cutting wheel 1 with the cutting arm 21 and the blade 24 provided therein rotates around the cable which protrudes centrally through the cutting blade 1. The blade 24 thus makes a cutting movement tangential to the cable, wherein it is not pressed into the foil but cuts into this in the course of the rotary movement. The preferably round, convex shape of the blade means that the valleys of the foil between the individual strands of cables with several parallel or twisted strands can also be reached. This is due to the fact that the radius of the blade 24 is less than the radius of the foil valley. The foil is incised by the blade perpendicular to the cable axis. The defined cutting depth is always maintained by means of a stop formed by the contact surface 26. The blade 24 can thus only penetrate into the foil to the same depth as the distance by which the blade 24 overhangs relative to the contact surface 26.

By, if necessary repeated, reversal of the direction of rotation of the cutting wheel 1 (pendulum pace), an even better incision of the foil can often be achieved for some types of cable.

In order to ensure that a cutting arm 21 with the correct blade 24 is used in the cutting wheel 1, the end 23 of the cutting arm 21 is preferably provided with a code, which in the example illustrated is embodied as a binary code in the form of a series of holes 27. Four holes will result in a 4-bit encoding. This means that 16 different cutting arms 21 can be detected. This allows the controller to monitor whether the correct combination of blade 24 and contact surface 26 is used. A bar code, a QR code or else a different type of coding using colours etc., could also be provided. In principle, another conceivable option would be a numerical code that is scanned by a camera.

FIG. 4 shows the cutting wheel 1 in an installed position, with the cutting arm 21 inserted, which enables the cutting wheel 1 to be set into rotation via the drive 2. The binary code 27 is scanned via a sensor, for example, a light barrier 8. This enables two tasks to be fulfilled. Firstly, it can be used to detect the edge of the cutting arm 21 in order to define the exact location of the cutting wheel 1. In addition, after the positioning of the knife wheel 1 the light barrier 8 can detect whether there is a hole at the point of the blade arm being scanned.

In addition, in FIG. 4 a stop cylinder 9 can be identified. By extending this stop cylinder 9 into the path of rotation of the end 23 of the cutting arm 21, the through passage for the cable in the cutting wheel 1 can be released, by the cutting wheel 1 moving via a stepper motor of the drive 2 into a position in which the cutting arm 21 is moved away from the centre of the cutting wheel 1 against the force of the magnet 13.

The cut sections of the foil are removed via an extraction device A. At the beginning of the extraction process the two clamping jaws 4 are moved apart. This causes the two adhesive tapes 5 to form a funnel, which is pushed over the end of the cable and/or the foil. After scoring the foil by the cutting device S, the two jaws 4 press the tape 5 onto the foil. The adhesive tape rollers 3 are withdrawn, and the foil adhering to the adhesive tape 5 is therefore removed from the strands and remains between the adhesive tapes 5. In the rear position, the adhesive tape 5 is clamped, the adhesive tape rollers 3 moving forward again on the carriage 6 are wound off by the length of the stroke and the process can start again from the beginning.

For some types of cable, despite an optimal design of the cutting device S and the extraction device A, a complete removal of the foil is impossible, so that even between any two adjacent strands of the cable, a small triangle of the foil remains. This can then be pushed back by means of a further device, a sheathing abrasion arrangement, in a further working step. This contains a head which closes centrally around the cable, which is equipped with shaped jaws closing tightly around the cable. After their closure, by means of at least one jet of compressed air, the foil residue is then raised and pushed backwards with the tightly fitting head. This allows all cable types to be satisfactorily processed.

REFERENCE LIST

1 cutting wheel
2 drive
3 adhesive tape rollers
4 clamping jaws
5 adhesive tape
6 carriage for adhesive tape rollers and clamping jaws
7 retracting roller for adhesive tape
8 light barrier
9 stop cylinder
11 external toothing on the cutting wheel
12 bar magnet 13 magnet
14 milled-on part
21 cutting arm
22 swivelling part of cutting arm
23 end of cutting arm
24 blade
25 tongue on cutting arm
26 contact surface
27 coding of the cutting arm
S cutting device
A extraction mechanism

The invention claimed is:

1. An apparatus for removing an inner sheathing of electrical conductors of a multi-core cable, the inner sheathing being a foil located between a screen or an insulation and the electrical conductors, the apparatus comprising:
at least one holding arrangement/clamping device comprising a magnet (13) which exerts a force that is applied to a cutting arm (21) for axial and rotational clamping of the multi-core cable,
a cutter assembly (1,21) comprising a cutting wheel (1) and the cutting arm (21),
the cutting wheel having the magnet (13) and an other magnet (12) mounted on opposite sides to one another with respect to a rotational axis of the cutting wheel,
the cutting arm (21) being fastenable to a mounting point on the cutting wheel (1) surrounding the cable and oriented coaxially thereto, the cutting arm being pivotable about an axis passing through the mounting point and oriented substantially parallel to the rotational axis,
the cutter assembly being rotatable about a longitudinal axis of the multi-core cable, and having at least one tongue (25) on the cutteing arm to which a force can be applied in a direction of the longitudinal axis,
wherein the at least one tongue on the cutteing arm comprises a contact surface (26) for placing on a surface of the inner sheathing and, directly adjacent thereto, a blade (24) which protrudes beyond this contact surface (26) by no more than a thickness of the sheathing.

2. The apparatus according to claim 1, wherein the cutting arm (21) is movably and detachably fastened to the cutting wheel (1) by the other magnet (12).

3. The apparatus according to claim 1, wherein the cutting arm (21) extends from the mounting point, on the cutting wheel (1), to a sector of the cutting wheel (1) substantially opposite thereto with respect to a center of the cutting wheel (1), the holding arrangement/clamping device is located in the sector that acts on the cutting arm (21) and exerts a constant force.

4. The apparatus according to claim 1, wherein one of:
a controllable actuator is provided on the cutting wheel (1), which is designed to apply a force to the cutting arm (21) thus moving the cutting arm (21) away from the axis of the cutting wheel (1), or
a controllable actuator (9) is provided near the cutting wheel (1), which is designed to secure a free end (23) of the cutting arm (21) without impeding the rotation of the cutting wheel (1).

5. The apparatus according to claim 1, wherein the contact surface (26) and the blade (24) are formed on the tongue (25) protruding from the cutting arm (21) in a direction toward a center of the cutting wheel (1), the contact surface (26) and the blade (24) are formed in the region of a convex section of the cutting arm (21), wherein the tongue (25), and the contact surface (26), which comes into contact with the cable, and the cutting edge (24) are each convex.

6. The apparatus according to claim 1, wherein the blade (24) or the cutting arm (21) further comprise a coding (27) of properties, the properties consisting of the blade, the contact surface and the cutting arm present, and/or coding useful as a marker of a reference position of the cutting wheel (1), and a scanning device (8) for scanning the coding (27) being integrated in the apparatus, and an evaluation unit being integrated in the apparatus, which is designed for receiving and further processing a signal of the scanning device (8).

7. The apparatus according to claim 1, further comprising an extraction device being designed for automatically axially extracting the sheathing and which is integrated in the apparatus, the extraction device comprising at least one clamping jaw(4), and at least one adhesive roller (3) having adhesive tape (5) for removing parts of the sheathing that are cut off or incised.

8. The apparatus according to claim 7, further comprising a sheathing abrading arrangement integrated into the device, between the extraction device and the cutter assembly, the sheathing abrading arrangement comprising a head which closes centrally around the cable, which is equipped with jaws closing tightly around the cable, such that after their closure, by means of at least one jet of compressed air, foil residue is raised and pushed backwards with the head.

9. An apparatus for removing an inner sheathing of electrical conductors of a multi-core cable, the sheathing being a foil located between a screen or an insulation and the electrical conductors, comprising;
at least one holding arrangement/clamping device comprising a magnet (13) which exerts a force that is applied to a cutting arm (21) for axial and rotational clamping of the cable; and
a cutter assembly (1,21) comprising a cutting wheel (1) and the cutting arm (21), the cutter assembly being rotatable about a longitudinal axis of the multi-core cable, and having at least one tongue (25) on the cutteing arm comprises a contact surface (26) provided for placing on the surface of the inner sheathing and directly adjacent thereto a blade (24), which protrudes beyond this contact surface (26) preferably by no more than the thickness of the sheathing
the cutting wheel having the magnet (13) and an other magnet (12) mounted on opposite sides to one another with respect to a rotational axis of the cutting wheel,
the cutting arm (21) being fastenable to a mounting point on the cutting wheel (1) surrounding the cable and oriented coaxially thereto, the cutting arm being pivotable about an axis passing through the mounting point and oriented substantially parallel to the rotational axis.

* * * * *